Patented Nov. 25, 1941

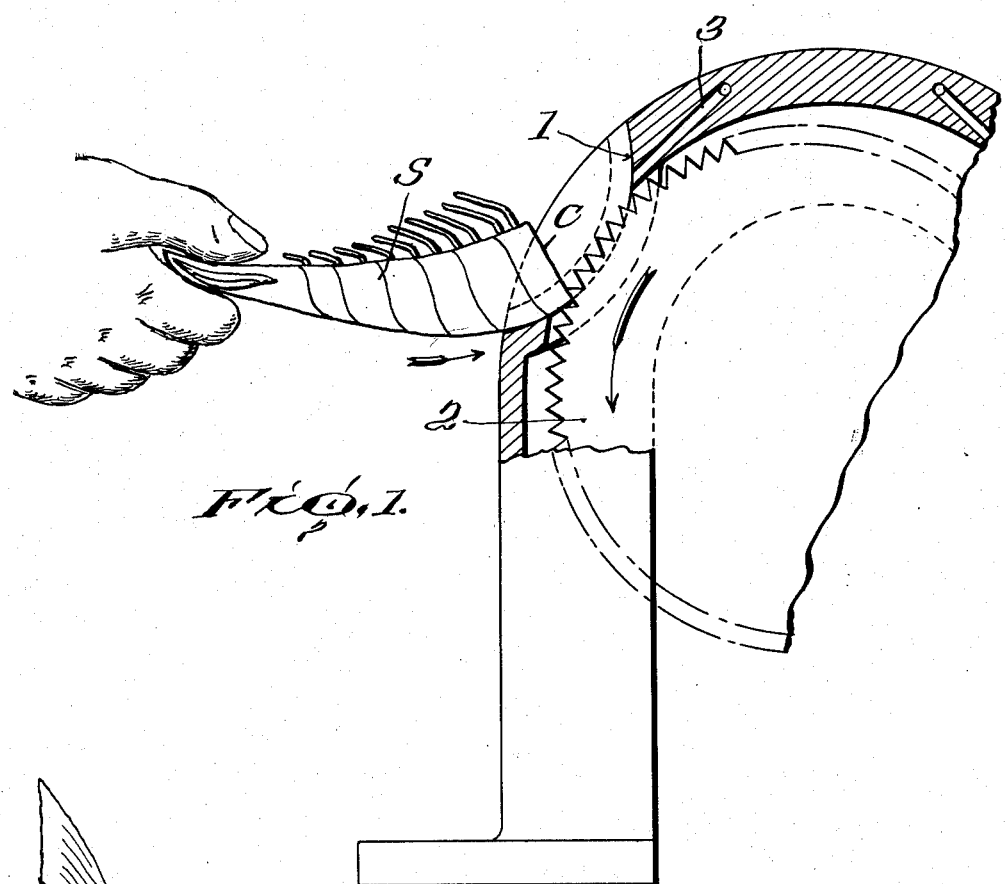
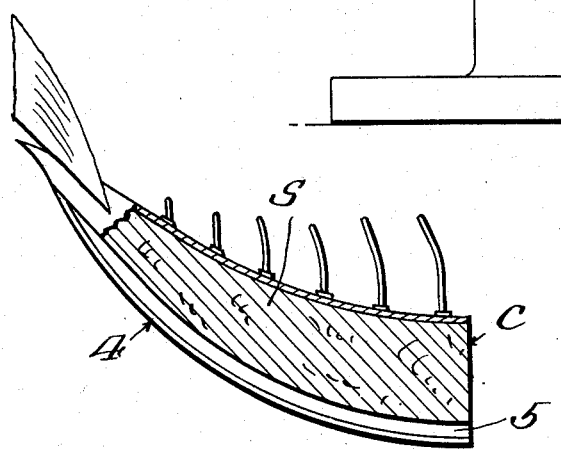
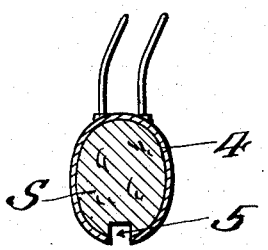

2,263,694

UNITED STATES PATENT OFFICE 2,263,694

METHOD OF DEVEINING SHRIMP

Ralph V. Grayson, Houston, Tex., assignor to Kroger Grocery & Baking Company, Cincinnati, Ohio, a corporation of Ohio Application December 13, 1939, Serial No. 309,097

6 Claims. (Cl. 99—111)

The invention relates to a new and useful method of preparing shrimp for the market.

It is well known that shrimp in the normal process of life absorbs in the flesh only desirable and safe quantities of solids, chemicals and liquids, and the unabsorbed matters are eliminated through the alimentary tract. In this waste matter which is in process of elimination there is often a sufficient quantity of iodine which contributes to troublesome discoloration of the fluid in the wet pack of canned shrimp. There is sometimes present in this waste matter arsenic in sufficient quantity to be injurious to the health of the consumer. It is the usual practice to remove the head of the shrimp and with it the digestive organs. There still remains in the shrimp the waste matter contained in the sand vein or sand gut which extends along the crest side or back of the shrimp embedded in the flesh beneath the shell.

An object of the present invention is to provide a method whereby the sand vein with the waste matter therein is completely removed from the shrimp so that poisonous matter and waste unfit for human consumption may be completely eliminated from the shrimp.

A further object of the invention is to provide a method for removing the sand vein which includes the progressive cutting away of the shell of the shrimp from one end thereof to the other in a narrow region covering the vein of the shrimp and simultaneously rupturing and removing the vein therefrom.

A still further object of the invention is thorough washing of the channel during the progressive removal of the sand vein.

These and other objects will in part be obvious and will in part be hereinafter more fully described.

In the drawing which shows by way of illustration one method of removing the sand vein and the waste matter therein, and the product produced thereby, Figure 1 is a view showing diagrammatically the presentation of the shrimp after the head has been removed to a cutting device which progressively removes the shell in a narrow region covering the sand vein of the shrimp and simultaneously ruptures and removes the sand vein from the shrimp.

Figure 2 is a longitudinal section through the shrimp showing the channel formed during the removal of the vein, and Figure 3 is a transverse section near the head end.

In the carrying out of my improved method, the shrimp as soon as it is brought to the dock by the fisherman, is promptly weighed and the heads removed. They are then inspected, the culls rejected and the product is graded. The shrimp is then washed and placed in water of approximately 34° F. This not only cools the shrimp, but renders it rigid to facilitate the removal of the vein which will be hereinafter referred to as de-veining the shrimp.

By the method illustrated in the drawing, the shrimp is presented cut end first, with the back or crest side of the shrimp downward, to a cutting knife which is in the form of a rotating disk having saw teeth shaped so as to cut a narrow channel in the shell, and also to cut a shallow channel in the flesh of the shrimp only sufficient to rupture and completely remove the sand vein. In the drawing the shrimp is illustrated at S. The cut end $c$ is being directed along a concave guiding member 1 having a slot extending lengthwise thereof through which extends a rotating cutter 2. There is also a port 3 for forcibly projecting a jet of water on to the cutting member. The teeth of the cutting member contact with the shell 4, approaching the same from the inside thereof, and this cuts away the shell and also cuts a channel 5 in the shrimp along the crest or back thereof of sufficient depth to completely remove the vein and at the same time the jet of water washes out the channel and frees it of the ruptured parts and all waste matter.

By the method above described, the vein is completely removed from the head end of the shrimp to the tail end thereof. While I have described the method as consisting in progressively cutting the shell and removing the vein from the head end toward the tail, it will be obvious that the vein may be removed by cutting the shell from the tail end toward the head, or in any other way, but it is essential that a narrow channel only should be cut through the shell sufficient to permit the removal of the sand vein. It is preferable, however, to begin the cutting at the head end, as the tail serves as a very convenient means for presenting the shrimp to the cutting means. When the shrimp is cut along the narrow channel only sufficient to remove the sand vein, then the shell remains enclosing the greater portion of the body of the shrimp, and this will protect the body from contact with the oxygen of the air, which causes the flesh to deteriorate very rapidly. Furthermore, the retaining of the greater portion of the shell greatly facilitates the handling and the shipping of the shrimp, where the shrimp is to be iced and delivered to the wholesale markets in a raw condition. This produces a shrimp product which is freed from the waste matter before it is shipped, and this greatly facilitates in the maintaining of the shrimp in edible condition for consumption.

Furthermore, by my improved method of de-veining the shrimp, the shell is cut along the crest or back and this greatly facilitates the removal of the shell from the shrimp, together with the tail and crawlers. It is customary when shrimp is sold in the shell without de-veining, to remove the shell and cook the shrimp without removing the sand vein with the waste matter therein, as it is difficult and tedious to de-vein the shrimp after the shell is removed, and it is not practical to de-vein the shrimp by any hand-operated means available to the consumer.

When shrimp is de-veined by my improved method, soon after it is caught, this objectionable waste matter is at once removed and the de-veined shrimp can be very readily handled while raw and packed for shipment to the wholesale market. In another method of handling shrimp, the heads and shells are removed and the meat is blanched and frozen for shipment. Still another method consists in removing the heads and the shells and the packing of the shrimp in hermetically sealed containers in which the shrimp is processed. In all of the methods heretofore employed, so far as I am aware, this blanching of the shrimp and the packing of the shrimp in containers is accomplished without de-veining the shrimp. When my improved method is supplied, the shrimp is de-veined before the shell is removed, and when the shrimp is blanched or frozen and sent to the markets, or when the shrimp is placed in sealed containers and processed therein, this is all accomplished without the presence of this poisonous waste matter which may have heretofore been retained in the shrimp; therefore, a very much better product is produced for consumption which is free from all poisonous matters and waste unfit for human consumption.

Furthermore, when the shrimp is de-veined and later heat treated in the shell, the heat treating cycle may be carried out in a very much shorter period of time, by reason of the fact that the channel through the shell permits a better heat exchange during the heat treatment. Then again, when the shrimp is de-veined and the waste matter removed, together with the bacteria content therein, the processing time necessary to render the dry pack or wet pack sterile may be greatly reduced.

It is obvious that many changes may be made in the steps of my improved method of de-veining shrimp without departing from the spirit of the invention as set forth in the appended claims.

The apparatus shown in part diagrammatically, and referred to briefly, forms no part of the present invention, but is shown, described and claimed in my co-pending application Serial No. 309,662, filed December 16, 1939.

Having thus described the invention, what I claim as new and desire to secure by Letters Patent, is:

1. The process of de-veining shrimp consisting in cutting away the shell of the shrimp in a narrow region covering the vein and removing the vein from the shrimp through the narrow cut-away portion.

2. The process of de-veining shrimp consisting in progressively cutting away the shell of the shrimp from one end thereof to the other in a narrow region covering the vein of the shrimp and simultaneously rupturing and removing the vein therefrom.

3. The process of de-veining shrimp consisting in progressively cutting away the shell of the shrimp from one end thereof to the other in a narrow region covering the vein of the shrimp, simultaneously rupturing the vein and projecting a stream of water through the cut-away portion of the shell for removing the ruptured portions of the shrimp and the vein.

4. The process of de-veining shrimp by removing the head from the shrimp and progressively cutting away the shell from the head end toward the tail in a narrow region covering the vein of the shrimp and removing the vein from the shrimp through the cut-away portion in the shell.

5. The process of de-veining shrimp by removing the head from the shrimp and progressively cutting away the shell from the head end toward the tail in a narrow region covering the vein of the shrimp, and simultaneously rupturing the vein and projecting a stream of water through the cut-away portion in the shell for removing the ruptured portions.

6. The process of de-veining shrimp consisting in submerging the shrimp in water sufficiently cold to render the shrimp substantially rigid and cutting away the shell of the shrimp in a narrow region covering the vein and removing the vein from the shrimp through the narrow cut-away portion.

RALPH V. GRAYSON.